United States Patent [19]
Wiley

[11] Patent Number: 5,435,506
[45] Date of Patent: Jul. 25, 1995

[54] CLAMP WITH MECHANICALLY ATTACHED GROMMET

[75] Inventor: Walter H. Wiley, Palm Beach Gardens, Fla.

[73] Assignee: United Technologies Corporation, Hartford, Conn.

[21] Appl. No.: 204,914

[22] Filed: Mar. 2, 1994

[51] Int. Cl.⁶ ............................................. F16L 3/08
[52] U.S. Cl. ............................. 248/74.1; 248/74.4
[58] Field of Search .................. 248/74.1, 74.2, 74.3, 248/74.4, 62, 63, 316.1

[56] References Cited

U.S. PATENT DOCUMENTS

| | | | |
|---|---|---|---|
| 318,182 | 5/1885 | Guhl | 248/74.1 |
| 492,593 | 2/1893 | Taylor | 248/74.4 |
| 3,564,676 | 10/1968 | Oeser | 248/74.4 X |
| 4,270,250 | 6/1981 | Schon | 248/74.4 X |
| 4,817,897 | 4/1989 | Kreusel | 248/74.1 X |
| 4,978,090 | 12/1990 | Wichert et al. | 248/74.1 |
| 5,007,604 | 4/1991 | Richards | 248/74.1 |
| 5,237,909 | 8/1993 | Pirhadi | 248/74.4 X |
| 5,281,042 | 1/1994 | Belrose | 248/74.4 X |

Primary Examiner—Ramon O. Ramirez
Assistant Examiner—Korie H. Chan
Attorney, Agent, or Firm—Charles E. Sohl

[57] ABSTRACT

The present invention is a clamp with a mechanically attached grommet. The clamp secures and mounts cable, wiring, tubing, or the like to a structure. The clamp uses an outer shell, or a clamp shell, which houses a split grommet to grip the object being clamped. The grommet is mechanically attached to a low stress area in the clamp shell.

4 Claims, 4 Drawing Sheets

CLAMP WITH MECHANICALLY ATTACHED GROMMET

The Government has rights in this invention, pursuant to Contract No. F33657-91-C-0007 (.946) awarded by the Department of the Air Force.

TECHNICAL FIELD

This invention relates to clamps with grommets for mounting cable, wiring, or tubing.

BACKGROUND ART

Clamps are used in applications where electrical cables, bundles of wires, tubing, or the like need to be fixedly gripped and attached to a structure or component. Clamps typically have an outer shell, or a clamp shell, which houses a grommet made from an elastomeric material. The object to be clamped is placed within the grommet, which is placed inside the clamp shell where the grommet evenly grips the object. The grommet is made of an elastomeric material and exerts a cushioned gripping force against the gripped object. Grommets have a tendency to move within the clamp shell prior to and during assembly, during service, and during maintenance. The assignee of the present invention currently glues the grommets into the clamp shells, in gas turbine engine applications, because the grommets move radially and axially inside the clamp shells before and after installation.

When clamps are used for gas turbine engines or airframes, the use of glue to attach the grommet to the clamp shell is not practical. The gluing operation is not practical because it requires hours for the glue to cure, or it requires an external heat source to shorten the gluing cure time.

Other clamp designs, such as disclosed in U.S. Pat. No. 4,338,707, have a continuous metal band with a grommet wrapped around the outside band. These clamps, however, do not have a large access area for the tubing to be placed inside the band. To have access to the clamped object, a fastener is detached from the clamp. The loose fastener may be lost during maintenance on the clamp or on the gripped object. If the loose fastener is ingested during engine operation, the potential exists for foreign object damage to the engine.

Another clamp design, shown in U.S. Pat. No. 2,355,742, employs a grommet that requires an elaborate manufacturing process to mate the outer clamp shell to the grommet. The grommet has an isogrid pattern that projects from its outside diameter and mates into a mating groove in the inside diameter of the clamp shell. The manufacturing of the isogrid groove in the clamp shell is a costly process. In addition, when this disclosure is applied to an arcuate clamp, like the present invention, the material removed from the inside of the clamp shell is in a high stress area. If material is removed from the inside of an arcuate clamp shell in a high stress area, more material is needed to thicken the clamp shell to offset bending stresses. The added material results in a thick and heavy clamp shell.

DISCLOSURE OF INVENTION

It is therefore an object of the present invention to provide a clamp with a mechanically attached grommet, which does not have loose parts during maintenance.

Another object of the present invention is to utilize a standard size clamp shell with interchangeable grommets to allow clamping of different sizes of objects.

According to the present invention, a clamping plane is defined by a clamp shell that houses a grommet, which grips an object. The grommet has a pair of longitudinal ridges that extend radially therefrom and mate into a pair of longitudinal grooves in the clamp shell. The ridges are slightly larger in size than the grooves. When the ridges fit into the grooves an interference fit results, and the grommet becomes mechanically attached to the clamp shell. The interaction of the ridges and grooves prevents circumferential movement of the grommet relative to the clamp shell. The grooves are in a low stress area of the clamp shell and allow the clamp shell to be thin and light weight. A fastener attaches the clamp to a structure. When maintenance to the clamp or the gripped object is required, the fastener is loosened and the clamp shell is slid away from the gripped object. A retention means prevents the loosened clamp from loss during the maintenance. Eliminating the need to remove the fastener and retaining the clamp shell and grommet during maintenance reduce the possibility of foreign object damage to the gas turbine engine. The foregoing and other features and advantages of the present invention will become more apparent from the following description and accompanying drawings.

BEST MODE FOR CARRYING OUT THE INVENTION

Figure 1:
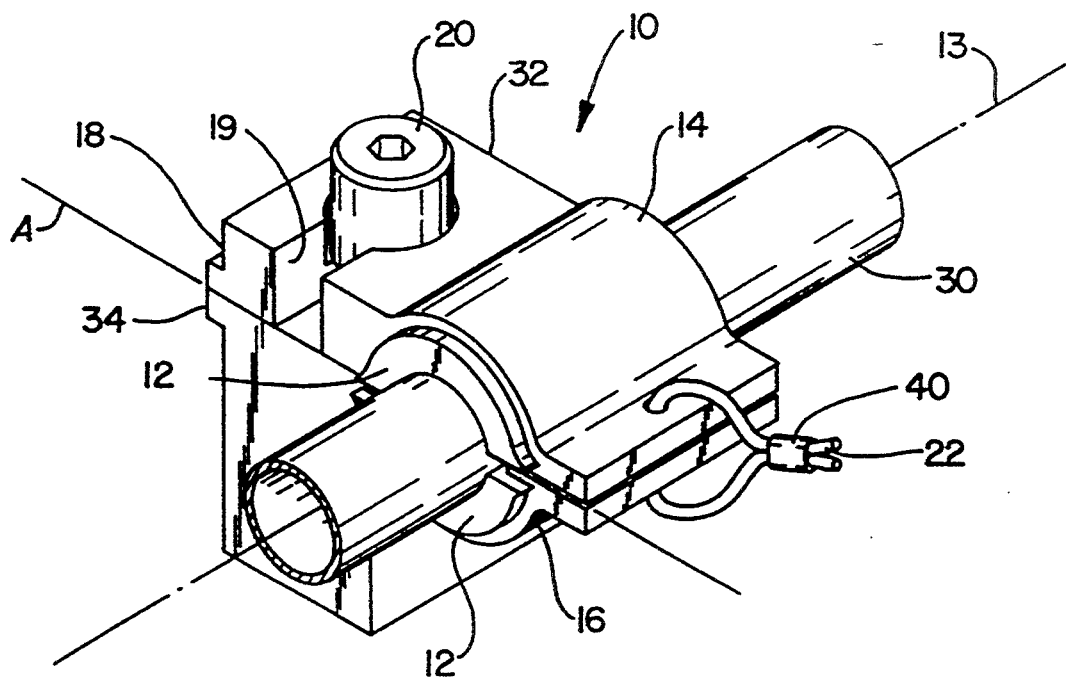
FIG. 1 is a perspective view of a clamp of the present invention.

As shown in FIG. 1, a clamp 10 for retaining a tube 30 has a pair of mating arcuate clamp shells 14, 16 that houses a pair of grommet halves 12, which contact and clamp the tube 30. The clamp shells 14, 16 mate parallel to Plane A of FIG. 1. As shown in this preferred embodiment, the use of a pair of clamp shells and a pair of grommet halves is not intended to limit the scope of the claims. More than a pair of clamp shells 14, 16 and grommet halves 12 may be used. The tube 30 is exemplary only of an object that is clamped.

Figure 5:
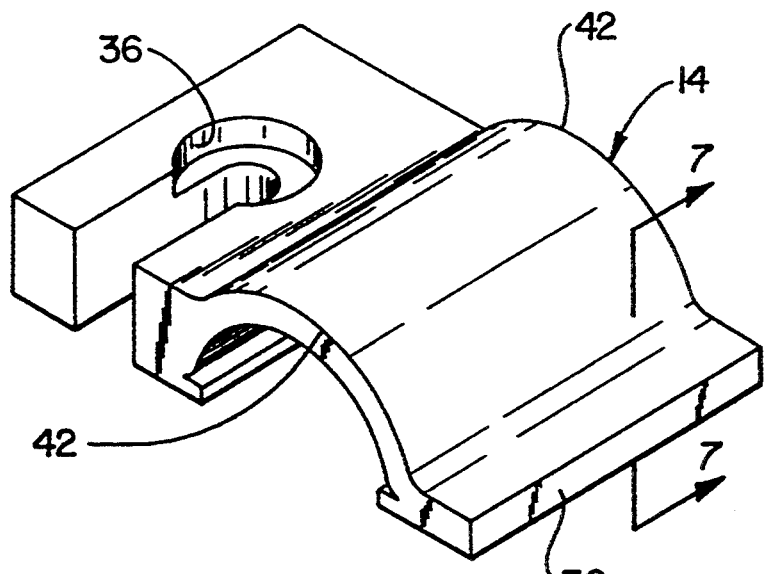
FIG. 5 is a perspective view of a clamp shell of the present invention.
Figures 6, 7:
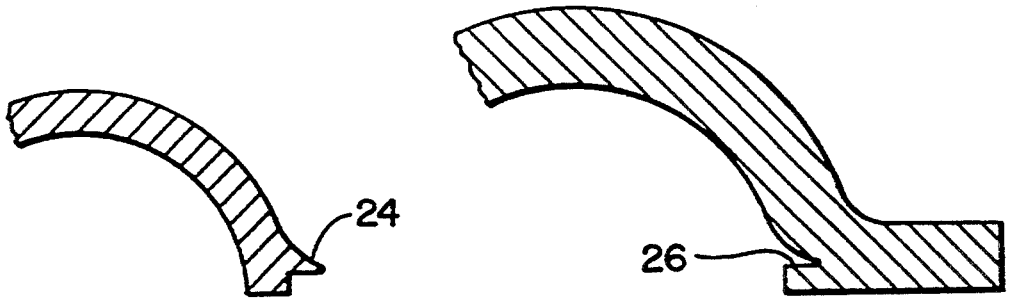
FIG. 6 is a front view of the grommet of the present invention.
FIG. 7 is a front view of the clamp shell of the present invention.

The clamp shells 14, 16 have a pair of symmetrical, axially oriented, and longitudinal inside acute angle (less than 90 Degrees) grooves 26, as shown in FIG. 5 and FIG. 7, which extend radially into the clamp shells 14, 16 from a major axis 13 of the gripped object. The grooves 26 are adjacent to Plane A and located in an area of low stress in the clamp shell. The low stress area of the clamp shell will be discussed in greater detail below.

Figure 4:
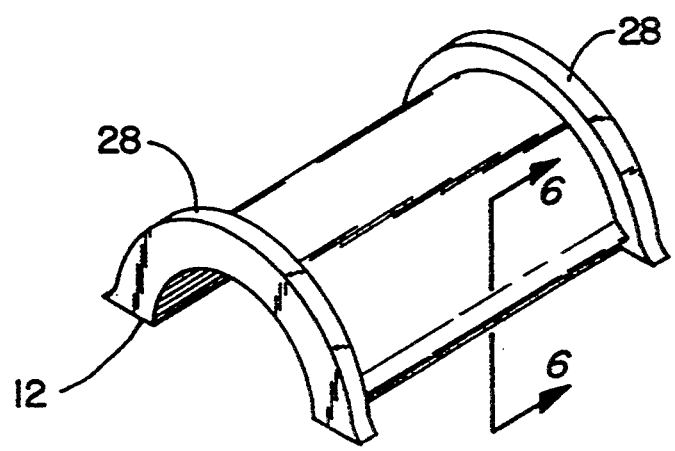
FIG. 4 is a perspective view of a grommet of the present invention.

As shown in FIG. 4 and FIG. 6, the grommet halves 12 each have a pair of symmetrical, axially oriented, and longitudinal ridges 24 that extend radially from the major axis 13 and outward from the grommet halves 12. Each of the grommet halves 12 also has a pair of ribs 28 that extend radially beyond the outside diameter of the grommet halves 12. A fastener housing 18 that has a first part 32 and a second part 34 connects to the clamp shells 14, 16. The first part 32 is connected to clamp shell 14, and the second part 34 is connected to clamp shell 16. The first part 32 has a counter bore 36 and a passageway 19. The second part 34 has a clearance hole 38 to accept a fastener 20, which fastens the clamp 10 to a structure. A retention means, or a tether 22, includes means 40 for forming a closed loop. The tether 22 attaches to a pair of flanges 30 that extend from the clamp shells 14, 16. The tether 22 keeps the clamp shells 14, 16 from being separated during assembly of the clamp and during maintenance to the clamp.

Figure 9:
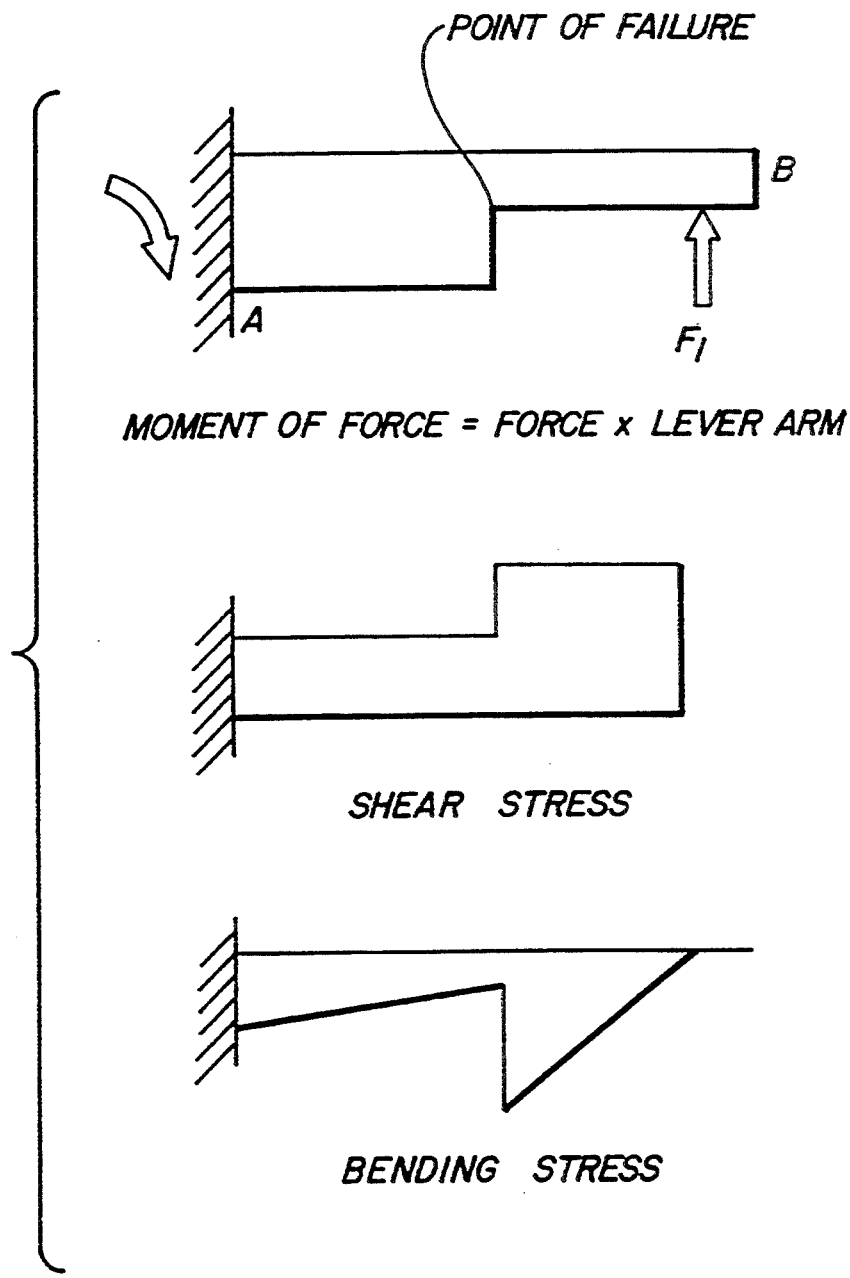
FIG. 9 is a schematic of a force on a lever arm.

The grooves 26 are located in a low stress area in the clamp shells 14, 16. Arcuate clamps of the present invention experience bending stress when they are attached to a structure at one end and grip an object at the other end, where the major axis 13 of the gripped object is offset from Plane A. This gripped object force, coupled with the stationary -fastener 20 in the fastener housing 18, creates a moment and bending stress in the clamp 10. Any material removed from the inside area of the clamp shell 14 or 16 weakens the clamp shell 14 or 16 and makes it more susceptible to the bending stress. The failure point of the clamp shell is a function of the bending stress and the section size of the material. FIG. 9 shows that as Force 1 (F1) moves away from the structure, the moment increases as the lever arm increases, however; the thick section of material has a greater effect on the stress in the part than does the moment. The part will break in the thin section as the force increases. The groove 26 is located adjacent to Plane A and next to the fastener housing 18. The groove 26 is in an area with the thickest cross section of material, which absorbs bending stress better than an area with a thinner cross section of material.

The clamping shells 14, 16 are preferably made from a light weight composite and have successfully been made from PMR-15 graphite fiber reinforced polymeric material available from DuPont Tribon Composites, Inc., Cleveland, Ohio. The PMR-15 graphite has a composition of about 55% graphite fiber with random orientation and about 45% polyamide matrix. The material is compression molded at about 315 Degrees Celsius (600 Degrees Fahrenheit) into the final configuration. The material may be continuously molded into the configuration needed and then sliced into individual clamp shells. The composite material has a high strength-to-weight ratio, which allows the clamp shells to be relatively thin and light weight. The composite shell is a naturally dampening material and acts as a heat insulator from the heat generated from a gas turbine engine.

Figure 8:
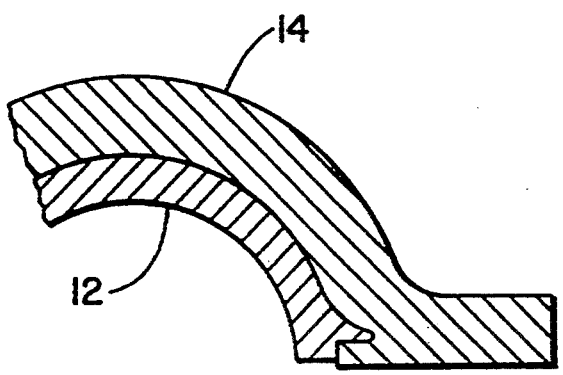
FIG. 8 is a front view of the grommet interfitted into the clamp shell.

Because the ridges 24 are slightly larger than the grooves 26, positioning the grommets halves 12 into the clamp shells 14 and interfitting the ridges 24 into the grooves 26, as shown in FIG. 8, provides an interference fit between the ridges 24 and the grooves 26. This interference fit, or engagement, mechanically attaches the grommet halves 12 to the clamp shells 14, 16. Mating the ridges 24 into the grooves 26 prevents circumferential movement of the grommet halves 12 relative to the clamp shells 14, 16 during assembly and maintenance of the clamp 10 and the tube 30.

When the grommet halves 12 are positioned into the clamping shells 14, 16, the ribs 28 extend beyond the axial ends 42 of the clamping shells 14, 16. The ribs 28 prevent axial movement of the grommet halves 12 relative to the clamping shells 14, 16 during assembly and maintenance of the clamping assembly 10 and the tube 30.

The grommet halves 12 may be made with different sizes of inside diameters, making the grommet halves 12 interchangeable with the clamping shells 14, 16. Therefore, the same size clamping shells 14, 16 may be utilized to clamp different sizes of tubing 30. Although this preferred embodiment uses a grommet with an inner circular opening, the inner opening may be any shape that grips the clamped object. The grommet halves 12 are preferably made of an elastomeric material, which maximizes the gripping effect on the tube 30 without damaging the tube 30. The grommet halves 12 have been successfully made from a high temperature resistant Flourosilicone material, which may be purchased from AGC, Inc., Meridan, Conn. or TA Manufacturing, Inc., Glendale, Calif.

The first part 32 of the fastener housing 18 has a passageway 19 to allow the clamp shell 14 to be removed from the tube 30 by loosening, but not removing, the fastener 20. The retention means, or tether 22, keeps the loose clamp shell 14 attached to the clamp assembly 10 during maintenance of the clamp assembly 10 or the tube 30. The tether 22 may be made from Nomex, a woven material from DuPont that may be obtained from Techniweave, Inc., Rochester, N.H. 03867. Nomex avoids the problems of using a braided wire, which is sharp and frequently injures maintenance personnel.

Figure 2:
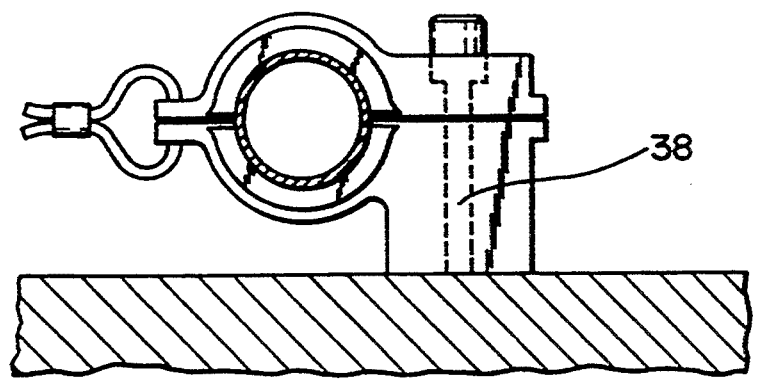
FIG. 2 is a front view of a clamp of the present invention.

The clamp 10 may utilize a single tube clamping scheme as shown in FIG. 1 and FIG. 2.

Figure 3:
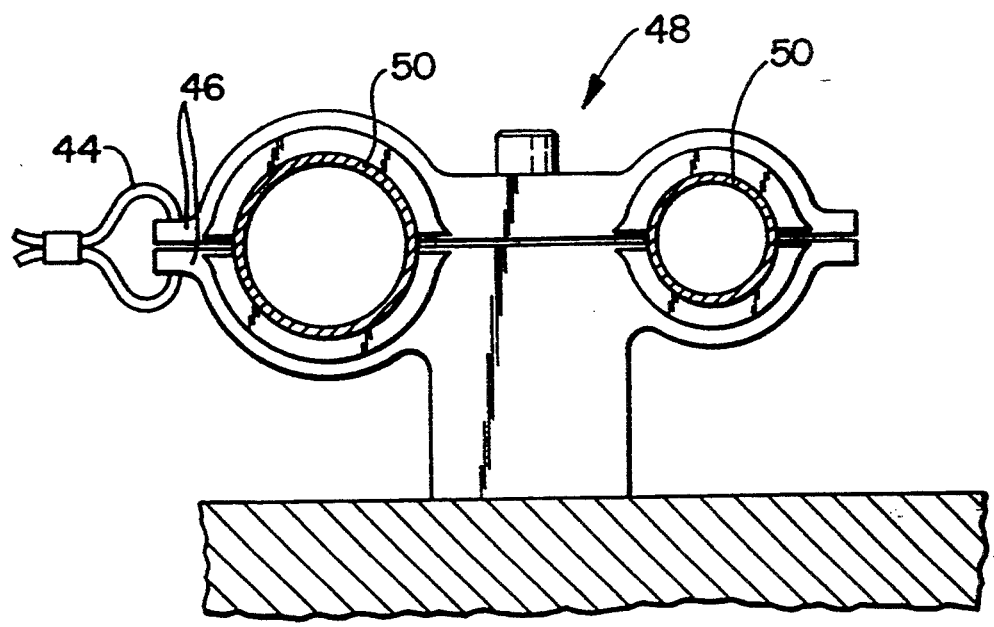
FIG. 3 is a front view of a multiple tube clamp of the present invention.

A second embodiment of the present invention is shown in FIG. 3, which is identical to the preferred embodiment except that it has a multiple tube clamping scheme. The multiple tube clamping scheme would only require a tether 44 on one set of the flanges 46 to allow access to the clamp 48 or the tubing 50 during maintenance.

Although this invention has been shown and described with respect to a detailed embodiment, it will be understood by those skilled in the art that various changes in form and detail may be made without departing from the spirit and scope of the claimed invention.

I claim:

1. A grommet clamp for clamping an object having a major axis, comprising:
   a pair of arcuate clamp shells to receive the object to be clamped, the clamp shells mate along a clamping plane, each clamp shell having a pair of symmetrical inside grooves that are axially oriented extending longitudinally along the major axis and adjacent to the clamping plane, each of the grooves are defined by a pair of surfaces of the clamp shell intersecting at an acute angle and extending radially into a low stress area of the clamp shells allowing the clamp shells to be thin and light weight;
   a pair of grommet halves located inside the clamp shells, each grommet having a pair of symmetrical ridges that are axially oriented extending longitudinally along the major axis and extending radially from the major axis and outward from each grommet half, the ridges being larger than the grooves so that the ridges and grooves mechanically attach when engaged to positively retain the grommet halves in the clamp shells preventing circumferential movement of the grommet halves relative to the clamp shells;

a fastener securing the clamp to an existing structure.

2. The clamp of claim 1 wherein the grommets further comprise a pair of ribs extending radially from the grommets that are adjacent to the clamp shells for preventing axial movement of the grommet halves relative to the clamp shells.

3. The clamp of claim 1 wherein the clamp shells further comprise a pair of flanges extending outwardly therefrom having a retention means for keeping the grommet clamp as an assembly during maintenance to the clamp and the gripped object.

4. The clamp of claim 1 wherein the clamp further comprises a block with a first part that has a passageway allowing one of the clamp shells to be disengaged from the gripped object and a second part that has a clearance hole to accept the fastener.

* * * * *

UNITED STATES PATENT AND TRADEMARK OFFICE
CERTIFICATE OF CORRECTION

PATENT NO. : 5,435,506

DATED : July 25, 1995

INVENTOR(S) : Walter H. Wiley and Robert Fowler

It is certified that error appears in the above-identified patent and that said Letters Patent is hereby corrected as shown below:

On the title page, item:

[75] Inventors:—Walter H. Wiley, Palm Beach Gardens, Fla., and Robert Fowler, West Palm Beach, Fla.—

Signed and Sealed this

Twenty-seventh Day of February, 1996

Attest:

BRUCE LEHMAN

Attesting Officer     Commissioner of Patents and Trademarks